United States Patent [19]

Uchiyama et al.

[11] Patent Number: 4,643,889
[45] Date of Patent: Feb. 17, 1987

[54] SYSTEM FOR GENERATION OF SINGLET-DELTA OXYGEN

[75] Inventors: Taro Uchiyama, 2663-9, Naruse, Machida-shi, Tokyo; Kiwamu Takehisa, Yokohama; Isao Ishizaki, Iruma, all of Japan

[73] Assignees: Mitsui Grinding Wheel Co., Ltd., Saitama; Taro Uchiyama, Tokyo, both of Japan

[21] Appl. No.: 846,254

[22] Filed: Mar. 31, 1986

[51] Int. Cl.[4] ............................................. C01B 13/00
[52] U.S. Cl. ........................................ 423/579; 372/89
[58] Field of Search ........................... 423/579; 372/89

[56] References Cited

U.S. PATENT DOCUMENTS

| | | | |
|---|---|---|---|
| 4,246,252 | 1/1981 | McDermott et al. | 423/579 |
| 4,310,502 | 1/1982 | Wagner | 423/579 |
| 4,318,895 | 3/1982 | Richardson et al. | 423/579 |
| 4,342,116 | 7/1982 | MacKnight et al. | 423/579 |
| 4,461,756 | 7/1984 | Rockenfeller | 423/579 |
| 4,558,451 | 12/1985 | McDermott et al. | 423/579 |

OTHER PUBLICATIONS

Bachar, J., et al., Appl. Phys. Lett. 41(1), Jul. 1, 1982, pp. 16–18.
Bonnet, J., et al., Appl. Phys. Lett. 45(10), Nov. 15, 1984, pp. 1009–1011.
Richardson, R. J., et al., J. Appl. Phys. 52(8), Aug. 1981, pp. 4962–4969.

Primary Examiner—John Doll
Assistant Examiner—Wayne A. Langel
Attorney, Agent, or Firm—Gordon W. Hueschen

[57] ABSTRACT

A process for generating an excited molecular oxygen by a procedure which comprises causing a mixture of an alkaline aqueous solution with hydrogen peroxide to wet the surface portion of a layer of a hydrophilic and gas-pervious material, causing a molecular chlorine-containing gas to penetrate said layer from the side opposite said surface thereof, enabling said gas during the penetration thereof through said material to react with said mixed aqueous solution which has wetted said surface portion of said material, and thereby inducing generation of said excited molecular oxygen, $O_2(^1\Delta)$, through said surface portion of said layer wetted by said mixed aqueous solution.

18 Claims, 12 Drawing Figures

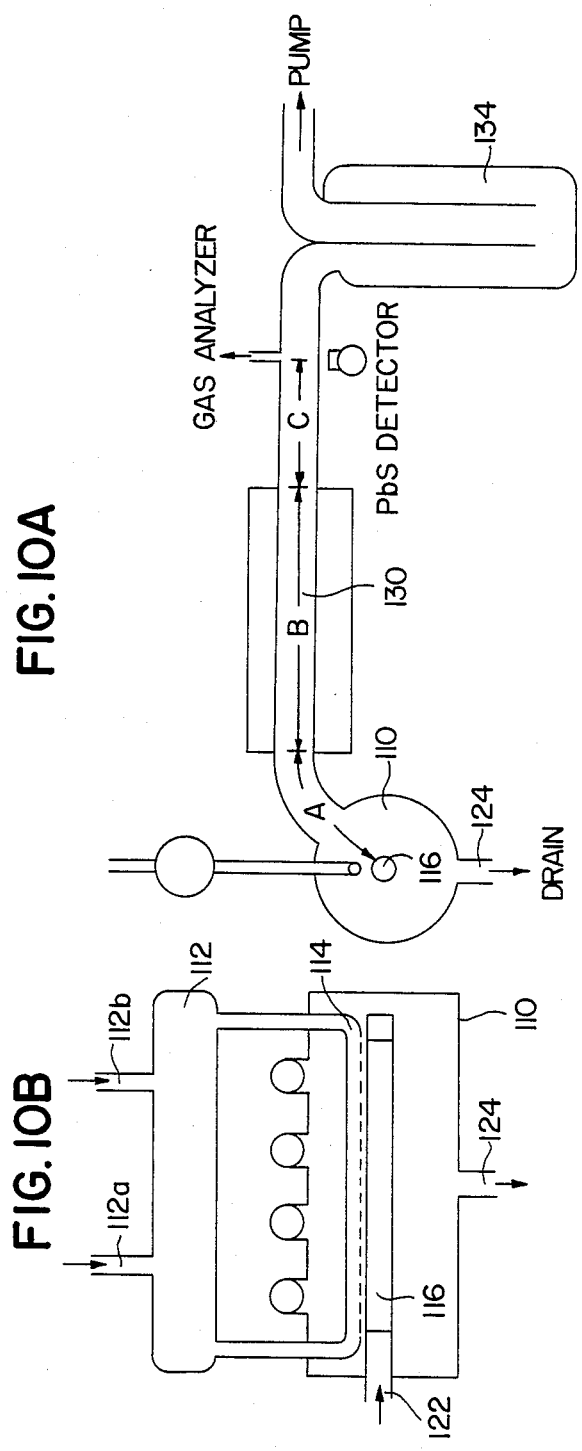

SYSTEM FOR GENERATION OF SINGLET-DELTA OXYGEN

BACKGROUND OF THE INVENTION

1. Field of the Invention

This invention relates to a system for the generation of singlet-delta oxygen, and more particularly it relates to an improved system for the generation of molecular oxygen in the excited singlet-delta electronic state, $O_2(^1\Delta)$, by the reaction of a liquid with a gas.

2. Description of Prior Art

The excited molecular oxygen, $O_2(^1\Delta)$, is mainly used as an exited species reactant in the chemical iodine laser.

The chemically excited iodine laser is a laser which oscillates the transition between an excited atomic iodine, $I(^2P_{\frac{1}{2}})$, originated in a chemical reaction and completed by transfer of energy from the excited molecular oxygen, $O_2(^1\Delta)$, and an atomic iodine, $I(^2P_{3/2})$, in the ground state. This excited molecular oxygen, $O_2(^1\Delta)$, is generated by the reaction of an aqueous hydrogen peroxide solution ($H_2O_2$) with chlorine gas in an aqueous solution of an alkali such as sodium hydroxide, for example. The reaction involved herein can be represented by the following reaction formula.

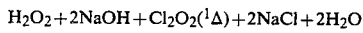

$$H_2O_2 + 2NaOH + Cl_2O_2(^1\Delta) + 2NaCl + 2H_2O$$

The methods heretofore adopted for this reaction have generally comprised injecting chlorine gas in the form of bubbles into a mixture of $H_2O_2$ with an aqueous sodium hydroxide solution [U.S. Pat. Nos. 4,461,756, 4,246,252, 4,310,502, and 4,432,116; J. Appl. Phys., 52 (8), August (1981); Appl. Phys. Lett., 45 (10), Nov. 15 (1984); and Appl. Phys. Lett., 41 (1), 1 July (1982)]. In accordance with these methods, however, since the generated $O_2(^1\Delta)$ must pass the solution and the proportion of the $O_2(^1\Delta)$ quenched in the solution is very large, the ratio of generation actually obtained [the proportion of the partial pressure of $O_2(^1\Delta)$ to the whole oxygen pressure] is only about 40 to 60%. Further, these methods have suffered a disadvantage that when the volume of chlorine gas is increased, the heat of reaction includes heavy formation of bubbles and impedes the reaction and limits the amount of $O_2(^1\Delta)$ produced.

An object of this invention, therefore, is to provide a novel system for the generation of singlet-delta oxygen.

Another object of this invention is to provide a system for generating the excited molecular oxygen, $O_2(^1\Delta)$, in an extremely high ratio, by the reaction of a liquid with a gas.

SUMMARY OF THE INVENTION

The objects described above are accomplished by a system for the generation of excited molecular oxygen by a procedure which comprises causing a mixture of an alkaline aqueous solution with hydrogen peroxide to wet the surface portion of a thin layer of a hydrophilic and gas-pervious material, causing a molecular chlorine-containing gas to penetrate the layer from the side opposite the surface thereof, enabling the gas during the penetration thereof through the material to react with the mixed aqueous solution which has wetted the surface portion of the material, and thereby inducing generation of the excited molecular oxygen, $O_2(^1\Delta)$, through the surface portion of the layer wetted by the mixed aqueous solution.

DESCRIPTION OF THE DRAWINGS

FIG. 10A is a schematic diagram illustrating a position of measurement in the system of the present invention, FIG. 10B is a cross section taken through FIG. 10A along the line XA—XA.

DESCRIPTION OF PREFERRED EMBODIMENT

Figure 1:
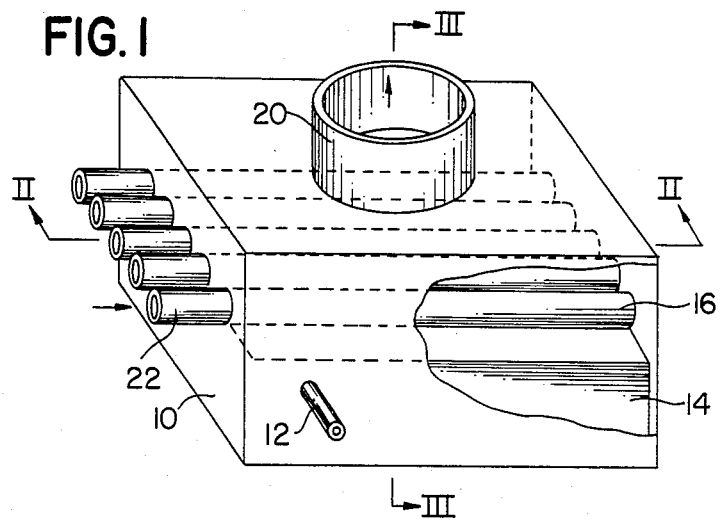
FIG. 1 is a partially cutaway schematic perspective view illustrating a typical system for the generation of excited molecular oxygen, as one embodiment of the present invention.

In the system of this invention, to initiate the reaction described above, a mixture of an alkaline aqueous solution such as, for example, the aqueous solution of a hydroxide of alkali metal such as sodium hydroxide, potassium hydroxide, or lithium hydroxide or a hydroxide of alkaline earth metal such as calcium hydroxide or magnesium hydroxide with a high-concentration aqueous solution of hydrogen peroxide is caused to wet the surface portion of a layer of a hydrophilic and gas-pervious material possessing fine pores and, at the same time, a molecular chlorine-containing gas is caused to penetrate the layer from the side opposite the surface thereof. As the result, the mixed aqueous solution wetted in the surface portion of the layer of the material contacts and reacts with chlorine while the gas is penetrating the material and the excited molecular oxygen $O_2(^1\Delta)$, consequently produced is issued through the surface portion of the layer wetted by the aqueous solution.

In accordance with the present invention, as the molecular chlorine-containing gas is pressed into the layer of the aforementioned material from the side opposite the surface portion wetted by the mixed aqueous solution, the gas penetrates the layer and the chlorine of the gas contacts and reacts with the aqueous solution and the excited molecular oxygen, $O_2(^1\Delta)$, is generated on the side of the surface portion wetted by the aqueous solution. This reaction of the aqueous solution with the chlorine occurs in an extremely thin layer on the surface of the layer of the material. Thus, the excited molecular oxygen, $O_2(^1\Delta)$, so generated immediately departs from the surface of the aqueous solution and moves into an another empty space in which the gas flows. The probability that the excited molecular oxygen once generated is quenched by collision with other molecules in the aqueous solution is extremely small.

The alkaline aqueous solution is desired to be an aqueous solution of an alkali metal hydroxide, particularly an aqueous solution of potassium hydroxide or sodium hydroxide. The pH of the mixed aqueous solution generally falls in the range of 7.5 to 14, preferably 8 to 11. The concentration of hydrogen peroxide in the mixed aqueous solution generally falls in the range of 30 to 90% by weight, preferably 50 to 80% by weight.

As examples of hydrophilic and gas-pervious materials, there may be cited porous ceramics, porous glass, porous metal, and porous organic materials, (such as hydrophilic treated polypropylene, polyvinyl chloride and fluorine resin). The pores in the material have an average diameter generally in the range of 1 to 20 $\mu$m, preferably 3 to 7 $\mu$m. Porosity is 20 to 85%, preferably 35 to 85%, because when the porosity is less than 20%, permeability is too low, and when the porosity is more than 85%, it is difficult to maintain the strength, although it is desirable that the porosity is as high as possible. Further, cumulative pore volume is at least 90% of length of two fold length of the mean diameter and at most 10% of length of half length of the mean diameter, preferably at least 95% and at most 5% respectively. This material may be in any desired shape. Examples of shapes assumed by the material include a film, a sheet, and a cylindrical body such as a hollow pipe and a hollow fiber. The thickness of the layer of this material generally falls in the range of 0.01 to 20 mm, preferably 0.1 to 5 mm.

The molecular chlorine-containing gas may be pure chlorine gas or a mixture of chlorine gas with an inert gas (such as, for example, nitrogen, helium, or argon). The amount of the molecular chlorine-containing gas to be supplied generally falls in the range of 1 to 100 mmol/cm$^2$.min, preferably 2 to 20 mmol/cm$^2$.min as Cl$_2$. The concentration of chloride gas in the aforementioned mixture is not less than 5% by volume, preferably 100% by volume. The atmosphere on the side of generation of the excited molecular oxygen is kept under low pressure generally in the range of 0.1 to 100 Torr, preferably 0.3 to 10 Torr.

Figure 2:
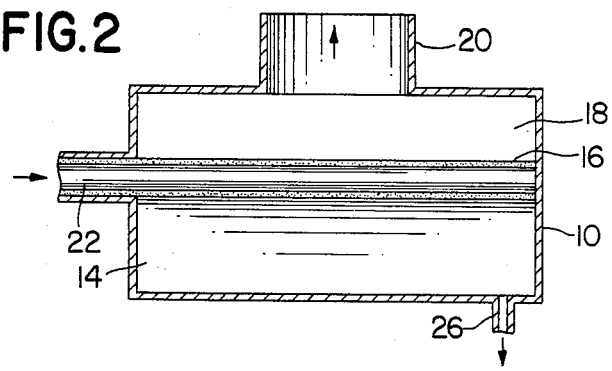
FIG. 2 is a cross section taken through FIG. 1 along the line II—II.
Figure 3:
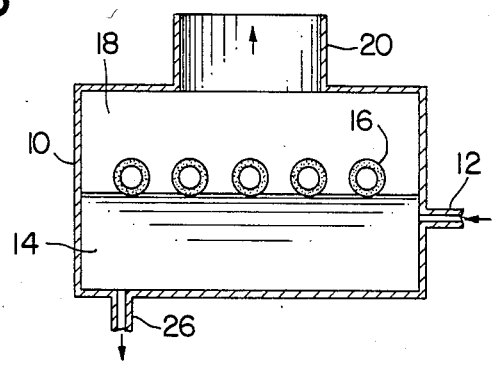
FIG. 3 is a cross section taken through FIG. 1 along the line III—III.

Now, the present invention will be described more specifically below with reference to the accompanying drawings. As illustrated in FIGS. 1-3, at least one hollow pipe 16 is disposed continuously to the liquid surface of an aqueous solution layer 14 formed by feeding a mixed aqueous solution of an alkaline aqueous solution with an aqueous hydrogen peroxide solution through a mixed aqueous solution inlet 12 into the lower part of a reaction vessel 10 and an empty space 18 overlying the aqueous solution layer 14 is provided with an oxygen gas outlet 20 connected to a pipe (not shown). A mixed solution outlet 26 is provided when necessary for the purpose of maintaining the concentration of the aqueous solution constant. The hollow pipe 16 to be used in the apparatus is a ceramic pipe possessing fine pores of an average diameter of 5 $\mu$m.

In this apparatus, the mixed aqueous solution in the reaction vessel 10 is allowed to maintain its concentration constant by feeding the mixed aqueous solution of an alkaline aqueous solution with an aqueous hydrogen peroxide solution through the inlet 12 and discharging it through outlet 20. In this case, the aqueous hydrogen peroxide solution is desired to have as high a concentration as possible. The concentration generally falls in the range of 70 to 90% by weight, preferably about 90% by weight. The voluminal ratio of the aqueous hydrogen peroxide solution to the alkaline aqueous solution is about 5:1. In the mixed aqueous solution, therefore, the concentration of the hydrogen peroxide is 32 to 82% by weight and that of the alkali is 3 to 25% by weight. Although the component aqueous solution may be fed separately to the reaction vessel 10, they are desired to be fed in the form of a homogeneous mixed aqueous solution to the reaction vessel. The reaction vessel 10 is desired to be evacuated with a vacuum pump to a pressure under not more than 10 mTorr in advance of the admission of the mixed aqueous solution. The amount of the mixed aqueous solution to be fed to the reaction vessel is such that the pipe 16 sinks to a depth in the range of 0.5 to 4 mm, preferably 1 to 2 mm below the liquid surface of the mixed aqueous solution. The mixed aqueous solution, by the phenomena capillary, wets the entire surface portion of the pipe 16 from the lowermost part of the pipe 16 which is held in contact with the mixed aqueous solution. The molecular chlorine-containing gas fed in through the gas inlet 22 is caused by the difference of pressure inside and outside the pipe to pass through the fine pores in the pipe and reach the surface portion of the pipe, there to contact and react with the mixed aqueous solution and generate an excited molecular oxygen, $O_2(^1\Delta)$. The excited molecular oxygen so generated is discharged from the system through the oxygen gas outlet 20. The flow volume of the molecular chlorine-containing gas as Cl$_2$ generally falls in the range of 1 to 100 mmol/cm$^2$.min, preferably about 5 mmol/cm$^2$.min, based on the unit outer circumferential area of the ceramic pipe.

Figure 4:
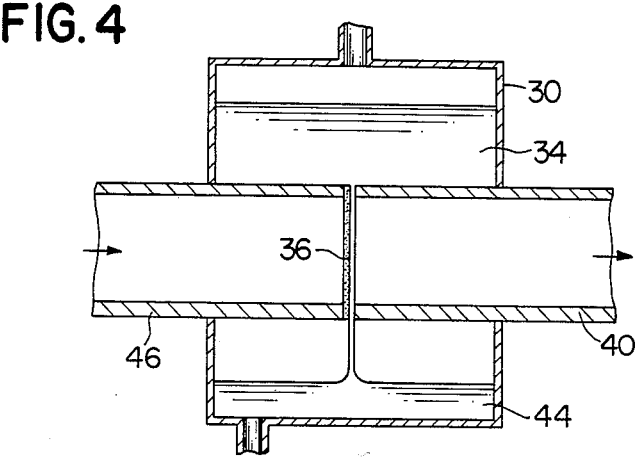
FIG. 4 is a cross section illustrating another embodiment of this invention.

FIG. 4 illustrates another embodiment of this invention. A reaction vessel 30 is provided in the intermediate portion thereof with a gas feed chamber 46 and a gas discharge chamber 40 opposed to the gas feed chamber 46. To one end (gas discharge chamber side) of the gas feed chamber 46, a thin sheet of thin membrane 36 made of a hydrophilic and gas-pervious material is attached vertically or diagonally. A mixed aqueous solution 34 of an aqueous hydrogen peroxide solution with an alkaline aqueous solution is stored above the two chambers 46, 40 and is allowed to fall in drops onto the chambers, the thin sheet or thin membrane of the material is wetted with the mixed aqueous solution. The gas discharge chamber 40 and the reaction chamber 30 are evacuated in advance to a stated pressure and then the gas feed chamber 46 is supplied with the molecular chlorine-containing gas. As the result, the chlorine gas penetrates the thin sheet or thin membrane 36, comes into contact and reacts with the mixed aqueous solution to induce generation of an excited molecular oxygen, $O_2(^1\Delta)$. The excited molecular oxygen so generated is discharged from the system through a gas discharge chamber 40. The mixed aqueous solution which has flowed down the thin sheet or thin membrane collects in the lower part of the reaction vessel 30 to form a liquid layer 44. The liquid layer 44 may be withdrawn from the system when necessary.

Figure 5:
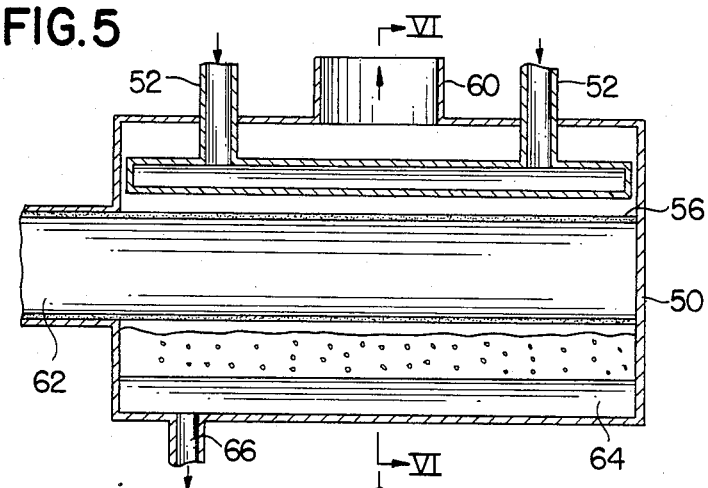
FIG. 5 is a cross section illustrating yet another embodiment of this invention.
Figure 6:
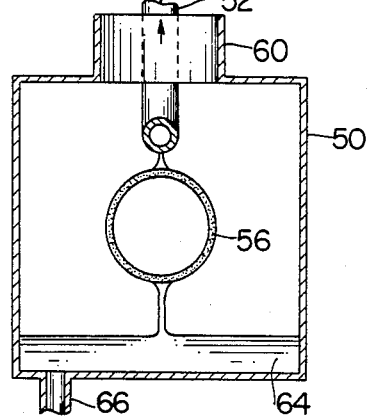
FIG. 6 is a cross section taken through FIG. 5 along the line VI—VI

FIG. 5 and FIG. 6 illustrate yet another embodiment of this invention which is based on the same principle as the embodiment of FIG. 4. A reaction vessel 50 is provided in the intermediate portion thereof with a cylindrical gas feed chamber 56 made of a hydrophilic and gas-pervious material which is disposed approximately horizontally and further provided above the gas feed chamber with a mixed aqueous solution feed device 68. The reaction vessel 50 is evacuated in advance to a stated pressure and then the mixed aqueous solution is allowed to fall in drops from dropping orifices or at least one slit in the lower part of the mixed aqueous solution feed device 68. As the result, the mixed aqueous solution flows down the surface of the cylindrical gas feed chamber 56 while wetting the surface portion of the chamber 56. Separately when the reaction vessel 50 is evacuated in advance to a stated pressure and then the molecular chlorine-containing gas is supplied through a gas inlet 62, the chlorine gas by the difference of pressure is caused to find its way from the gas feed chamber 56 to the interior of the reaction vessel 50. During this passage, the chlorine gas comes into contact and reacts with the aforementioned mixed aqueous solution to induce generation of an excited molecular oxygen, $O_2(^1\Delta)$. The excited molecular oxygen so generated is withdrawn from the system through the gas outlet 60. The mixed aqueous solution which has flowed down the surface of the cylindrical gas feed chamber 56 collects in the lower part of the reaction vessel 50 to form a liquid layer 64. The liquid layer may be discharged from the system when necessary. If necessary, the cylindrical gas feed chamber may be rotated.

Figure 7:
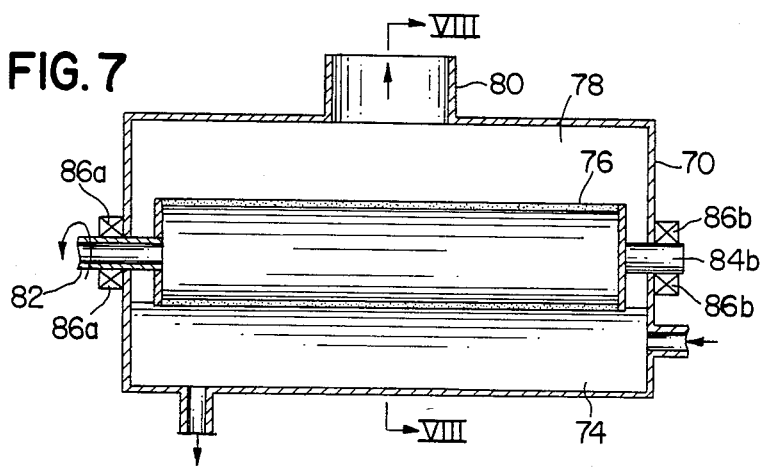
FIG. 7 is a cross section illustrating a further embodiment of this invention.
Figure 8:
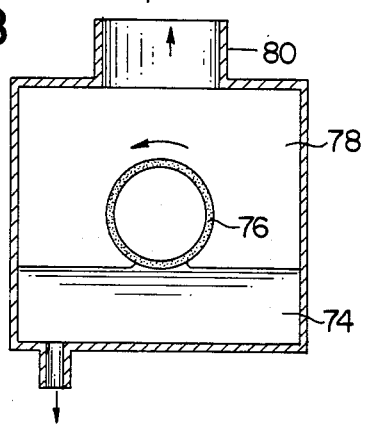
FIG. 8 is a cross section taken through FIG. 7 along the line VIII—VIII.

FIG. 7 and FIG. 8 illustrate still snother embodiment of the present invention. In an apparatus similar to the apparatus of FIGS. 1-3, a cylindrical gas feed chamber 76 made of a hydrophilic and gas-pervious material and disposed inside a reaction vessel 70 is provided around the central axis thereof with rotary shafts 84a, and 84b, so as to be rotatably supported by bearings 86a, and 86b respectively. The cylindrical gas feed chamber 76 has the lower part thereof immersed in a mixed aqueous solution 74. When this chamber 76 is located about its axis, therefore, the external surface thereof is wholly wetted with the solution. When the reaction vessel 70 is evacuated to a stated pressure and the molecular chlorine-containing gas is supplied through a gas inlet 82, the chlorine gas penetrates the layer of the aforementioned material and comes into contact and reacts with the mixed aqueous solution to induce generation of an excited molecular oxygen, $O_2(^1\Delta)$. The excited molecular oxygen so generated is withdrawn from the system throug a gas outlet 80. The mixed aqueous solution is allowed to maintain the concentration thereof constant because the solution is fed in through the inlet 72 and discharged through the outlet 88.

Figure 9:
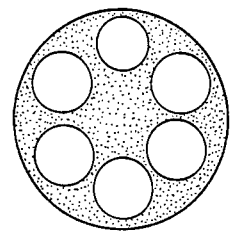
FIG. 9 is a cross section illustrating a typical shape of the layer of a hydrophilic and gas-pervious material to be used in the present invention.

FIG. 9 is a cross section illustrating a typical cylindrical gas feed chamber made of a hydrophilic and gas-pervious material used in the present invention.

EXAMPLES 1 TO 4

In an apparatus constructed as shown in FIGS. 1-3 (using one gas feed chamber 16), a cylindrical ceramic pipe containing pores of an average diameter of 4 to 5 μm and having an outside diameter of 10 mm, a length of 230 mm, and a wall thickness of 1 mm was used as a gas feed chamber 16. To the reaction vessel 10, a mixture pH about 10 to 500 ml of an aqueous hydrogen peroxide solution having a hydrogen peroxide concentration of 70% by weight and 500 ml of an aqueous sodium hydroxide solution having a sodium hydroxide concentration of 43% by weight was supplied. Then, the reaction vessel was evacuated to 5 mTorr and chlorine gas was fed into the gas feed chamber 16. The results are shown in Table 1. The absolute amount of $O_2(^1\Delta)$ was measured with a PbS detector and the amount of unreacted chlorine was measured with a gas analyzer at a point separated by a distance, B, of 600 mm from the outlet of a pipe 600 mm in length after the pipe was cooled with a mixture of dry ice with alcohol to 195 K. at a point separated by a distance, A, of about 500 mm from the cylindrical gas feed chamber 16. The formed gas was suctioned at a rate of 3,000 liters/min. and was cooled with liquified nitrogen at 77 K. for removal of unused chlorine (FIG. 10A).

EXAMPLES 5 TO 10

An experiment was carried out with an apparatus illustrated in FIG. 10A and FIG. 10B. In a reaction vessel 110, a cylindrical ceramic pipe containing pores of an average diameter of 4 to 5 μm and having an outside diameter of 10 mm, a length of 230 mm, and a wall thickness of 1 mm was used as a gas feed chamber 116. A liquid dropping tube 114 (provided with orifices 0.3 mm in diameter spaced at intervals of 5 mm) connected to a mixing chamber 112 furnished with an aqueous hydrogen peroxide solution inlet 112a and an alkaline aqueous solution inlet 112b was disposed on the aforementioned gas feed chamber 116. The reaction was caused by feeding chlorine gas through a gas inlet 122 and introducing dropwise the same mixed aqueous solution as used in Example 1 at a rate of 1 to 10 ml/sec. from the liquid dropping tube. The aqueous solution after the reaction was discharged through a liquid outlet 126. An excited molecular oxygen, $O_2(^1\Delta)$, was generated on the outer surface portion of a cylindrical gas feed chamber 116. The absolute amount of $O_2(^1\Delta)$ was measured with a PbS detector 132 and the amount of unreacted chlorine was measured with a gas analyzer at a point separated by a distance, B, of 600 mm from the outlet of a pipe 600 mm in length after the pipe was cooled with a mixture of dry ice with alcohol to 195 K. for removal of water at a point separated by a distance, A, of about 500 mm from the cylindrical gas feed chamber 116. The formed gas was suctioned at a rate of 300 liters/min and was cooled with liquified nitrogen at 77 K. in a cooler 134 for removal of unused chlorine. The results were as shown in Table 1.

Controls 1 to 4

A glass filter having 100 μm of average pore diameter, 10 mm of thickness and 12 cm of diameter was arranged in a vertically cylindrical reaction vessel at a lower portion thereof and the same mixed aqueous solution as Example 1 was fed into a space surrounded by the vessel and the upper surface of the glass filter. Then chlorine gas was fed into a space surrounded by the vessel and the lower surface of the glass filter so as to penetrate the glass filter under a similar condition of Example 5. Yields of $O_2(^1\Delta)/O_2$ and $O_2/Cl_2$ were measured by the same method as Example 5. The results were as shown in Table 1.

TABLE 1

| Example | Feed rate of chlorine mmol/ cm²-min | Pressure of oxygen mTorr | Pressure of $O_2(^1\Delta)$ mTorr | Yield $O_2(^1\Delta)/O_2$ % | Yield $O_2/Cl_2$ % |
|---|---|---|---|---|---|
| 1 | 0.97 | 683 | 512 | 75 | 80 |
| 2 | 1.57 | 773 | 549 | 71 | 73 |
| 3 | 2.21 | 840 | 563 | 67 | 62 |
| 4 | 2.88 | 902 | 568 | 63 | 51 |
| 5 | 1.10 | 751 | 511 | 68 | 99 |
| 6 | 2.08 | 1410 | 756 | 54 | 98 |
| 7 | 3.17 | 2119 | 918 | 43 | 91 |
| 8 | 5.74 | 2723 | 882 | 32 | 68 |
| 9 | 9.92 | 3853 | 894 | 23 | 60 |
| 10 | 15.82 | 5020 | 803 | 16 | 52 |
| Control | | | | | |
| 1 | 0.57 | 606 | 261 | 43 | 99 |

TABLE 1-continued

| Example | Feed rate of chlorine mmol/ cm²-min | Pressure of oxygen mTorr | Pressure of $O_2(^1\Delta)$ mTorr | Yield $O_2(^1\Delta)/O_2$ % | Yield $O_2/Cl_2$ % |
| --- | --- | --- | --- | --- | --- |
| 2 | 0.86 | 920 | 377 | 41 | 97 |
| 3 | 1.25 | 1327 | 504 | 38 | 94 |
| 4 | 1.58 | 1654 | 546 | 33 | 91 |

Figure 11:
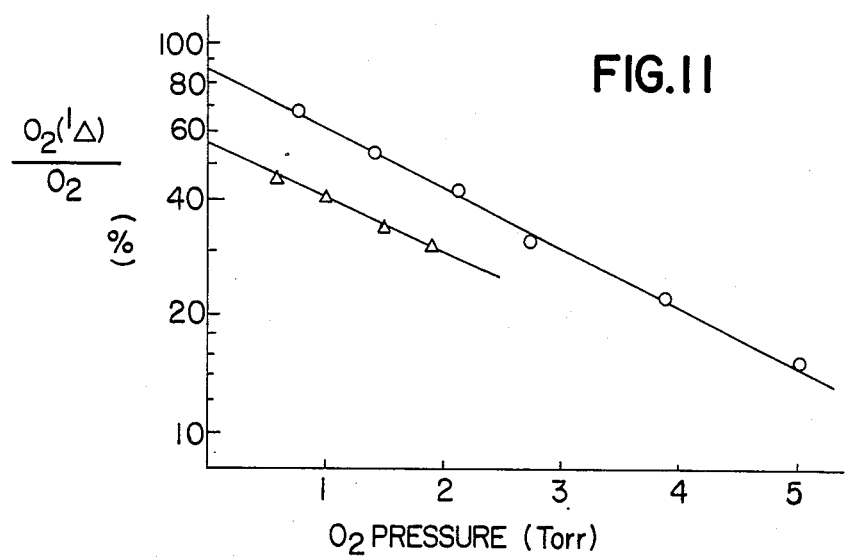
FIG. 11 is a graph showing a relation between $O_2$ pressure and $O_2(^1\Delta)/O_2$ of this invention.

Date of Table 1 were plotted to obtain FIG. 11.

What is claimed is:

1. A process for generating an excited molecular oxygen by a procedure which comprises causing a mixture of an alkaline aqueous solution with hydrogen peroxide to wet the surface portion of a layer of a hydrophilic and gas-pervious material, causing a molecular chlorine-containing gas to penetrate said layer from the side opposite said surface thereof, enabling said gas during the penetration thereof through said material to react with said mixed aqueous solution which has wetted said surface portion of said material, and thereby inducing generation of said excited molecular oxygen, $O_2(^1\Delta)$, through said surface portion of said layer wetted by said mixed aqueous solution.

2. A process according to claim 1, wherein said hydrophilic and gas-pervious material is at least one member selected from the group consisting of porous ceramic, porous glass, porous metal, and porous organic material.

3. A process according to claim 2, wherein the average pore diameter of said material is in the range of 1 to 20 μm.

4. A process according to claim 3, wherein said material is a porous ceramic.

5. A process according to claim 1, wherein said layer of said material is in the shape of a tube or a flat plate.

6. A process according to claim 2, wherein said layer of said material is in a cylindrical shape.

7. A process according to claim 6, wherein said cylinder made of said hydrophilic and gas-pervious material is disposed approximately horizontally.

8. A process according to claim 7, wherein said cylinder disposed approximately horizontally has the bottom portion thereof kept in slight contact with the liquid surface of a pool of said mixed aqueous solution.

9. A process according to claim 8, wherein said cylinder is attached fast to a vessel.

10. A process according to claim 8, wherein said cylinder is rotatably attached to a reaction vessel.

11. A process according to claim 7, wherein said approximately horizontally disposed cylinder is adapted so as to have the top portion thereof receive said mixed aqueous solution supplied from above.

12. A process according to claim 11, wherein said cylinder is attached fast to a reaction vessel.

13. A process according to claim 12, wherein said cylinder is rotatably attached to said reaction vessel.

14. A process according to claim 2, wherein said layer of said material has a flat smooth shape.

15. A process according to claim 14, wherein said flat smooth layer of said hydrophilic and gas-pervious material is disposed vertically or diagonally reactive to the direction intercepting the direction of flow of the molecular chlorine-containing gas and said mixed aqueous solution is consequently allowed to flow down said flat smooth layer.

16. A process according to claim 11, wherein the feed rate of said molecular chlorine-containing gas as $Cl_2$ is in the range of 1 to 100 mmol/cm².min per unit outer circumferential area of said layer of said material.

17. A process according to claim 1, wherein said alkaine aqueous solution is an aqueous solution of the hydroxide of an alkali metal or alkaline earth metal.

18. A process according to claim 17, wherein said alkaline aqueous solution is an aqueous solution of an alkali metal hydroxide.

* * * * *

UNITED STATES PATENT AND TRADEMARK OFFICE
CERTIFICATE OF CORRECTION

PATENT NO. : 4,643,889

DATED : February 17, 1987

INVENTOR(S) : Taro Uchiyama, Kiwamu Takehisa and Isao Ishizaki

It is certified that error appears in the above-identified patent and that said Letters Patent is hereby corrected as shown below:

Col. 1, line 27; "$H_2O_2 + 2NaOH + Cl_2O_2(^1\Delta) + 2NaCl + 2H_2O$" should read -- $H_2O_2 + 2NaOH + Cl_2 \longrightarrow O_2(^1\Delta) + 2NaCl + 2H_2O$ --

Col. 5, line 22; "snother" should read -- another --

Col. 5, line 41; "throug a" should read -- through a --

Signed and Sealed this

Fifth Day of January, 1988

Attest:

DONALD J. QUIGG

*Attesting Officer*  *Commissioner of Patents and Trademarks*